(12) United States Patent
Youm

(10) Patent No.: US 8,952,644 B2
(45) Date of Patent: Feb. 10, 2015

(54) APPARATUS AND METHOD FOR CONTROLLING MOTOR

(71) Applicant: Samsung Electro-Mechanics Co., Ltd., Suwon, Gyunggi-do (KR)

(72) Inventor: Jung Eun Youm, Gyunggi-do (KR)

(73) Assignee: Samsung Electro-Mechanics Co., Ltd., Suwon-Si, Gyeonggi-Do (KR)

(*) Notice: Subject to any disclaimer, the term of this patent is extended or adjusted under 35 U.S.C. 154(b) by 201 days.

(21) Appl. No.: 13/741,230

(22) Filed: Jan. 14, 2013

(65) Prior Publication Data
US 2014/0111132 A1 Apr. 24, 2014

(30) Foreign Application Priority Data

Oct. 18, 2012 (KR) .................. 10-2012-0115884

(51) Int. Cl.
*H02P 6/10* (2006.01)
(52) U.S. Cl.
USPC ............ 318/561; 318/610; 318/611; 318/619
(58) Field of Classification Search
USPC ................. 318/561, 609, 610, 611, 615, 619; 360/78.07, 75
See application file for complete search history.

(56) References Cited

U.S. PATENT DOCUMENTS

| | | | | |
|---|---|---|---|---|
| 5,223,778 A | * | 6/1993 | Svarovsky et al. | 318/610 |
| 5,971,579 A | * | 10/1999 | Kim | 700/42 |
| 6,046,560 A | * | 4/2000 | Lu et al. | 318/432 |
| 6,118,616 A | * | 9/2000 | Jeong | 360/78.07 |
| 6,335,845 B1 | * | 1/2002 | Yamaguchi et al. | 360/75 |

FOREIGN PATENT DOCUMENTS

| | | |
|---|---|---|
| KR | 2008-0110277 A | 12/2008 |
| KR | 2012-0058899 A | 6/2012 |

* cited by examiner

*Primary Examiner* — Paul Ip
(74) *Attorney, Agent, or Firm* — McDermott Will & Emery LLP

(57) ABSTRACT

There are provided an apparatus and a method for controlling a motor. The apparatus includes: a comparing unit comparing a target value and an output value and calculating error values therefrom; and a controlling unit controlling the motor by selecting one of a proportional control and a proportional integral control according to an average error value calculated by averaging the error values for each section having a predetermined interval and adjusting a gain value of the selected control.

17 Claims, 5 Drawing Sheets

APPARATUS AND METHOD FOR CONTROLLING MOTOR

CROSS-REFERENCE TO RELATED APPLICATIONS

This application claims the priority of Korean Patent Application No. 10-2012-0115884 filed on Oct. 18, 2012, in the Korean Intellectual Property Office, the disclosure of which is incorporated herein by reference.

BACKGROUND OF THE INVENTION

1. Field of the Invention

The present invention relates to an apparatus and a method for controlling a motor capable of selectively performing a proportional control and a proportional integral control according to an average error value and adjusting a gain value of the selected control.

2. Description of the Related Art

Proportional integral differential (PID) controllers, feedback controls allowing an output of a system to maintain a level equal to that of a reference voltage, based on deviation between a control variable and a reference input, are the most commonly used controllers in industrial facilities at present.

Specifically, PID controllers have a structure in which an output of an object to be controlled is measured and compared to a desired reference value or a set point, to thereby calculate an error therebetween, and then calculating a control value required for controlling the object by using the error value.

In the PID controller, proportional control is proportional to an error, a difference between the output of the object to be controlled and a target value, and an integral control is obtained by integrating the error for time, is used to remove a normal state error, and may generate a large overshoot in the case in which a gain thereof is relatively large. In addition, a differential control is used to differentiate the error and predict a response to the error in order to decrease the overshoot.

A driving force of the proportional integral differential control is a magnitude of the error value. That is, process inputs are continuously fed back so that the output value arrives at the set point. In the same control variables, as the error value is increased, a higher control output is generated, and as a gap between the error values is narrowed, a small control output is generated.

In the proportional integral differential controller, suitable controlling variables should be set according to characteristics of the process, such that vibrations in a normal state are relatively low, and a speed of removing a generated disturbance is also increased. Deriving relatively optimal variables from a specific process, as described above, is referred to as "proportional integral differential tuning."

However, a process model suggesting proportional integral differential tuning capable of implementing good control performance has not been suggested to date.

The following Related Art Document, related to an assisted power steering apparatus, discloses content in which the integral control is the main factor in performing the proportional integral control and gain value of the proportional control is changed according to speed, but does not disclose content in which the proportional control and the proportional integral control according to the average error value are selectively performed, and the error value is changed according to the average error value and the overshooting.

RELATED ART DOCUMENT

Korean Patent Laid-Open Publication No. 10-2008-0110277

SUMMARY OF THE INVENTION

An aspect of the present invention provides an apparatus and a method for controlling a motor selectively performing a proportional control or a proportional integral control according to a transient state and changing a gain value according to overshooting and a magnitude of an average error value.

According to an aspect of the present invention, there is provided an apparatus for controlling a motor, including: a comparing unit comparing a target value and an output value and calculating error values therefrom; and a controlling unit controlling the motor by selecting one of a proportional control and a proportional integral control according to an average error value calculated by averaging the error values for each section having a predetermined interval and adjusting a gain value of the selected control.

The controlling unit may include: an operating unit averaging the error value for each of the section and calculating the average error value; a control selecting unit selecting one of a proportional control and a proportional integral control according to the average error value; a gain adjusting unit adjusting the gain value of the control selected by the control selecting unit according to the average error value; and a proportional/proportional integral control unit controlling the motor according to the control selected from the control selecting unit and the gain value.

The control selecting unit may select one of the proportional control and the proportional integral control by comparing a magnitude of the average error value with a preset first reference value.

The control selecting unit may select the proportional control in the case in which the magnitude of the average error value is equal to the first reference value or more and may select the proportional integral control in the case in which the magnitude of the average error value is lower than the first reference value.

The gain adjusting unit may adjust the gain value by comparing negative and positive values of the average error values of sections adjacent to each other among the sections.

The gain adjusting unit may decrease the gain value in the case in which the negative and positive values of the average error values of the sections adjacent to each other among the sections are changed.

The gain adjusting unit may compare the magnitude of the average error value with a preset second reference value in the case in which the negative and positive values of the average error values of the sections adjacent to each other among the sections are maintained.

The gain adjusting unit may increase the gain value in the case in which the magnitude of the average error value is equal to the second reference value or more and may decrease the gain value in the case in which the magnitude of the average error value is lower than the second reference value.

The second reference value may include a plurality of preset third reference values, the plurality of third reference values may be arranged at a preset interval to thereby form gain adjusting sections having different gain adjustment magnitudes, and the gain adjusting unit may adjust the gain value according to the gain adjustment magnitude of the gain adjusting section in which the magnitude of the average error value exists.

The proportional/proportional integral control unit may include: a proportional controller performing the proportional control; and a proportional integral controller performing the proportional integral control.

The apparatus may further include a detecting unit detecting a motor speed to generate the output value.

According to another aspect of the present invention, there is provided a method of controlling a motor, including: comparing an output value generated by detecting a motor speed with a target value to generate an error value; averaging the error value for each section having a predetermined interval to generate an average error value; selecting one of a proportional control and a proportional integral control according to the average error value; and adjusting a gain value of one of the proportional control and the proportional integral control selected according to the average error value.

In the selecting of one control, the proportional control may be selected in a case in which magnitude of the average error value is a preset first reference value or more and the proportional integral control may be selected in a case in which the magnitude of the average error value is lower than the first reference value.

In the adjusting of the gain value, the gain value may be adjusted by comparing negative and positive values of the average error values of sections adjacent to each other among the sections.

In the adjusting of the gain value, the gain value may be decreased in a case in which the negative and positive values of the average error values are changed.

In the adjusting of the gain value, the magnitude of the average error value may be compared with a preset second reference value in a case in which the negative and positive values are maintained.

In the adjusting of the gain value, the gain value may be increased in a case in which the magnitude of the average error value is higher than the second reference value and the gain value may be decreased in a case in which the magnitude of the average error value is lower than the second reference value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
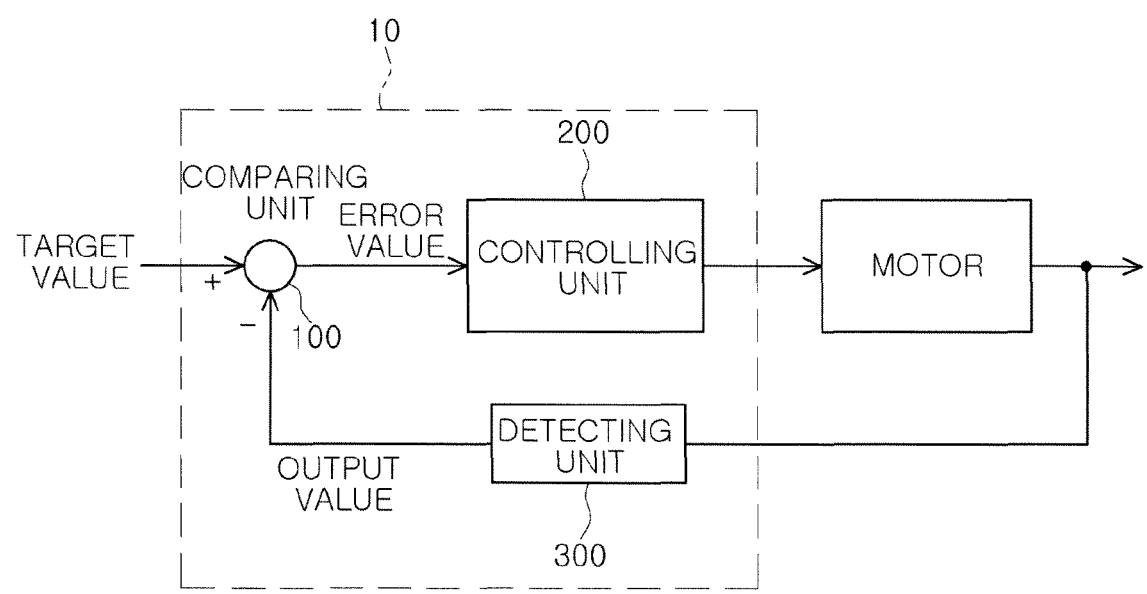
FIG. 1 is a block diagram showing an apparatus for controlling a motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a block diagram showing an apparatus for controlling a motor according to an embodiment of the present invention. Referring to FIG. 1, the apparatus for controlling the motor according to an embodiment of the present invention may include a comparing unit 100, a controlling unit 200, and a detecting unit 300.

The comparing unit 100 may compare a target value and an output value to thereby generate an error value. Specifically, the error value may be generated by a difference between the target value and the output value.

The controlling unit 200 may calculate the error value by averaging the error value for each section having a predetermined interval. The controlling unit 200 may select one of the proportional control and the proportional integral control according to the calculated error value and may adjust a gain value of the selected control according to the calculated error value.

The detecting unit 300 may detect motor speed to thereby send the generated output value to the comparing unit 100.

Figure 2:
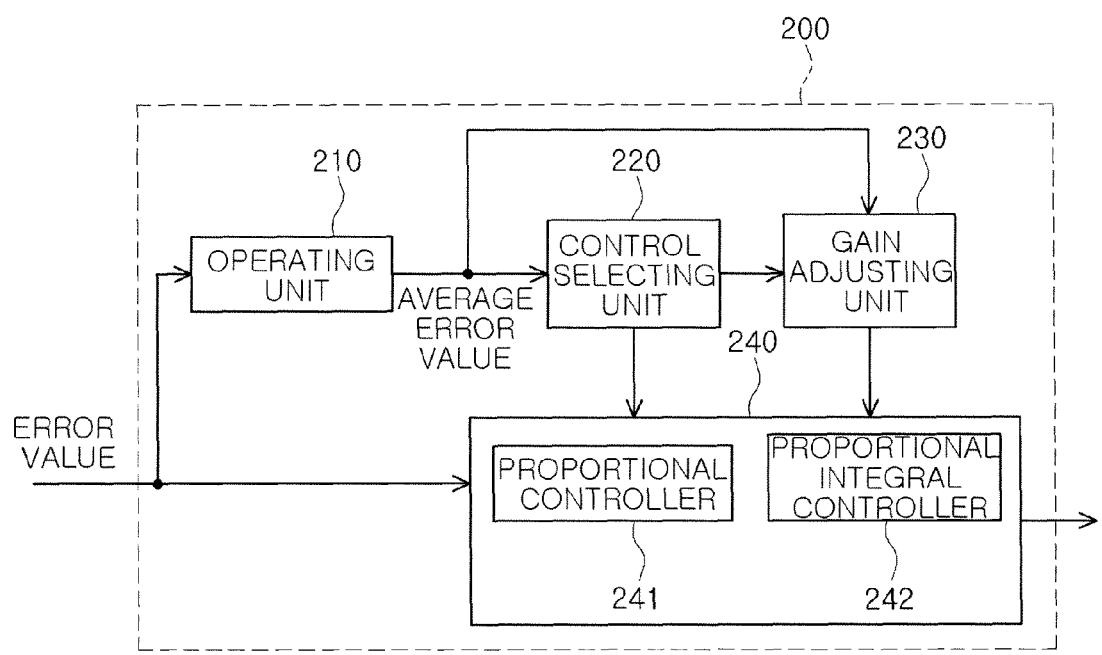
FIG. 2 is a block diagram showing a control unit, a component of the apparatus for controlling the motor according to an embodiment of the present invention.

FIG. 2 is a block diagram showing the control unit 200, a component of the apparatus for controlling the motor according to an embodiment of the present invention.

The controlling unit 200 may include an operating unit 210, a control selecting unit 220, a gain adjusting unit 230, and a proportional/proportional integral controlling unit 240.

The operating unit 210 may generate an average error value by averaging the error value for each section having a predetermined interval.

The control selecting unit 220 may select one of the proportional control and the proportional integral control according to the average error value generated by the operating unit 210.

Specifically, the control selecting unit 220 may compare magnitude of the average error value with preset first reference value to thereby select one of the proportional control and the proportional integral control. The preset first reference value may be the value set in order to distinguish between the transient state and the normal state of the motor.

In the case in which the magnitude of the average error value is the preset first reference value or more, the proportional control is selected. That is, in the case in which the magnitude of the average error value is the preset first reference value or more, this case is determined as the transient state to thereby select the proportional control.

However, unlike the above case, in the case in which the magnitude of the average error value is lower than the first reference value, the proportional integral control is selected. In the case in which the magnitude of the average error value is lower than the preset first reference value, this state is determined as being the normal state to thereby select the proportional integral control, such that the error of the normal state may be removed.

The gain adjusting unit 230 may adjust the gain value of the control selected by the control selecting unit 220, according to the average error value. Specifically, the gain adjusting unit 230 may adjust the gain value according to negative and positive values and a magnitude of the average error value.

The gain adjusting unit 230 may adjust the gain value through a comparison between the negative and positive values of the average error values of sections adjacent to each other among the sections having the predetermined interval. The comparing of the negative and positive values of the average error values of the sections adjacent to each other by the gain adjusting unit 230 may be a process in which an overshooting is detected.

That is, in the case in which the negative and positive values of the average error values of the sections adjacent to each other are changed, it is the case that overshooting is detected. Therefore, the gain value of the control selected by the control selecting unit 220 may be decreased.

However, unlike the above case, in the case in which the negative and positive values of the average error values of the sections adjacent to each other are maintained, the magnitude of the average error value may be compared with a preset second reference value. In the case in which the magnitude of the average error value is equal to the second reference value or more than the second reference value, the gain value may be increased, and in the case in which the magnitude of the average error value is lower than the second reference value, the gain value may be decreased.

In the case in which the magnitude of the average error value is equal to the second reference value or more than the second reference value, a response speed may be increased by increasing the gain value and in the case in which the magnitude of the average error value is lower than the second reference value, stability may be increased by decreasing the gain value.

In this case, the second reference value may include a plurality of preset third reference values, which may be arranged at preset intervals to thereby form gain adjusting sections having different gain adjustment magnitudes. In this case, the preset intervals may be set to have the same interval therebetween. However, the present invention is not limited thereto.

The gain adjusting unit 230 may determine the gain adjusting section in which the magnitude of the average error value exists and may adjust the gain value according to the gain adjustment magnitude of the gain adjusting section in which the magnitude of the average error value exists.

For example, in the case in which there are three third reference values (g1, g2, and g3), assuming that g1>g2>g3, the gain adjustment magnitudes of the gain adjustment section set by the g1 and g2 and the gain adjusting section set by the g2 and g3 may be set to be different from each other. The gain adjusting unit 230 may determine the gain adjusting section in which the average error value exists and may adjust the gain value according to the magnitude of the determined gain adjusting section.

That is, the gain value may be adjusted to vary according to the gain adjustment magnitude of the gain adjusting section in which the average error value exists. In addition, as the number of a plurality of third reference values increases, the number of determined gain adjusting sections also increases, whereby the gain value may be finely adjusted.

The proportional/proportional integral controlling unit 240 may control the motor according to the control selected from the control selecting unit 220 and the gain value generated from the gain adjusting unit 230. Specifically, the proportional/proportional integral controlling unit 240 may include a proportional controller 241 performing the proportional control and a proportional integral controller 242 performing the proportional integral control.

That is, in the case in which the error value is equal to the first reference value or more than the first reference value, the proportional controller 241 may control the motor by performing the proportional control for the motor, and in the case in which the error value is lower than the first reference value, the proportional integral controller 242 may control the motor by performing the proportional integral control for the motor.

Here, in the case in which the negative and positive values of the average error values of the sections adjacent to each other are changed, it is determined that overshooting is generated, such that the selected gain value is decreased, and in the case in which the negative and positive values of the average error values of the sections adjacent to each other are maintained, the magnitude of the average error value is compared with the second reference value and the gain value may be increased when the magnitude of the average error value is equal to the second reference value or more than the second reference value, and the gain value may be decreased when the magnitude of the average error value is lower than the second reference value.

Figure 3:
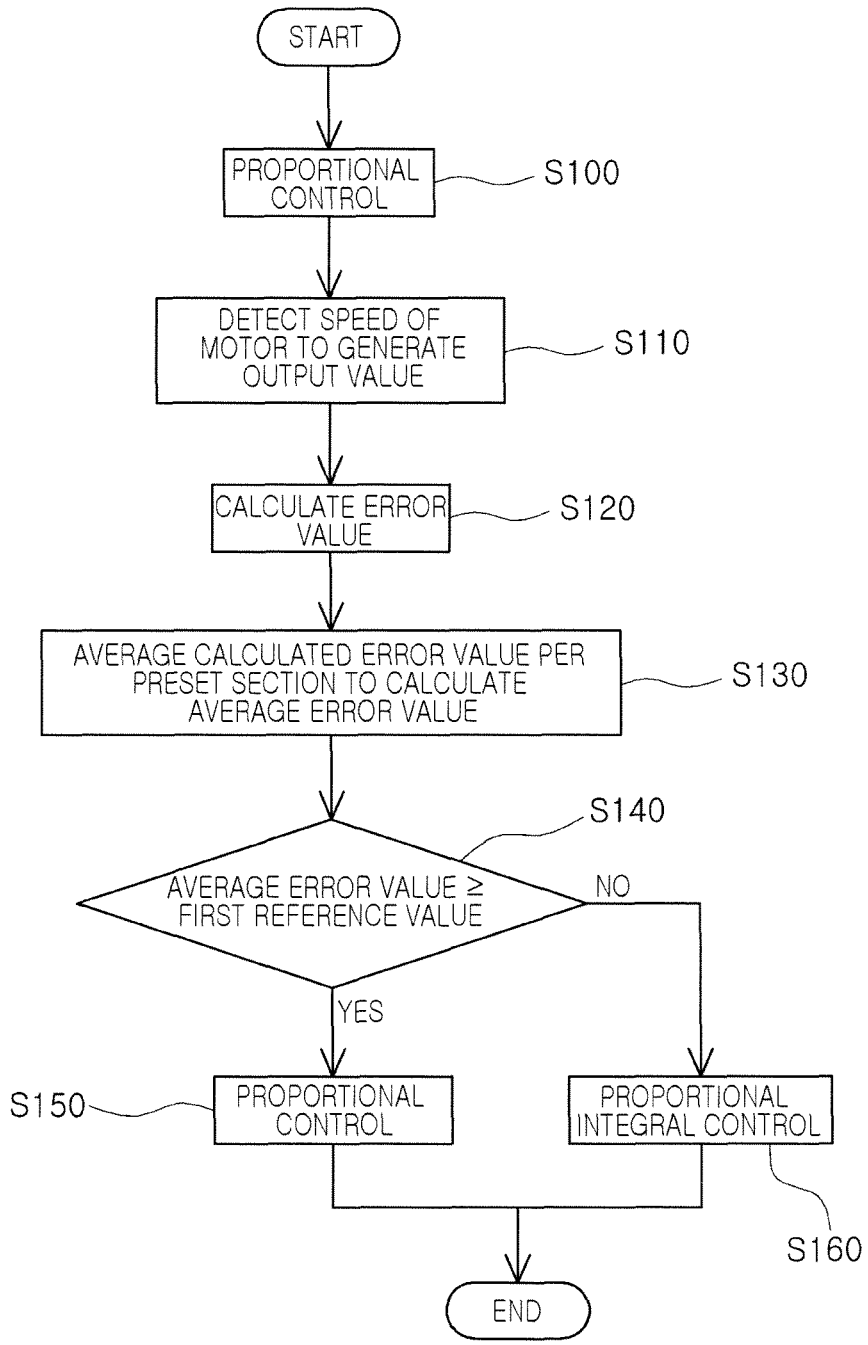
FIGS. 3 and 4 are flowcharts for describing a method of controlling a motor according to an embodiment of the present invention.

FIG. 3 is flowchart for describing a method of controlling a motor according to an embodiment of the present invention. A method of selecting one control from the proportional control and the proportional integral control of the method of controlling the motor according to the embodiment of the present invention will be described with reference to FIG. 3.

The apparatus for controlling the motor according to the embodiment of present invention may control the motor by performing the proportional control in the case in which the target value is changed or when the motor is initially driven (S100).

Next, the detecting unit 300 may detect the motor speed to thereby generate the output value according to the detected motor speed (S110).

The output value generated from the detecting unit 300 is sent to the comparing unit 100 and the comparing unit 100 may compare the output value sent from the detecting unit 300 with the target value, thereby calculating the error value (S120).

The comparing unit 100 sends the calculated error value to the operating unit 210 and the operating unit 210 may average the received error value for each section having the predetermined interval, thereby calculating the average error value (S130).

The control selecting unit 220 may compare the magnitude of the average error value calculated from the operating unit 210 with the preset first reference value (S140). The preset first reference value may be the value set in advance in order to distinguish between the transient state and the normal state. That is, in the case in which the magnitude of the average error value is the preset first reference value or more, this case may be determined as the transient state, and in the case in which the magnitude of the average error value is lower than the preset first reference value, this case may be determined as being the normal state.

That is, in the case in which the magnitude of the average error value is the preset first reference value or more, the control selecting unit 220 may determine this case as being the transient state to thereby select the proportional control and the proportional controller 241 may perform the proportional control (S150).

In addition, in the case in which the magnitude of the average error value is lower than the preset first reference value, the control selecting unit 220 may determine this case as the normal state to thereby select the proportional integral control and the proportional integral controller 242 may perform the proportional integral control (S160).

Figure 4:
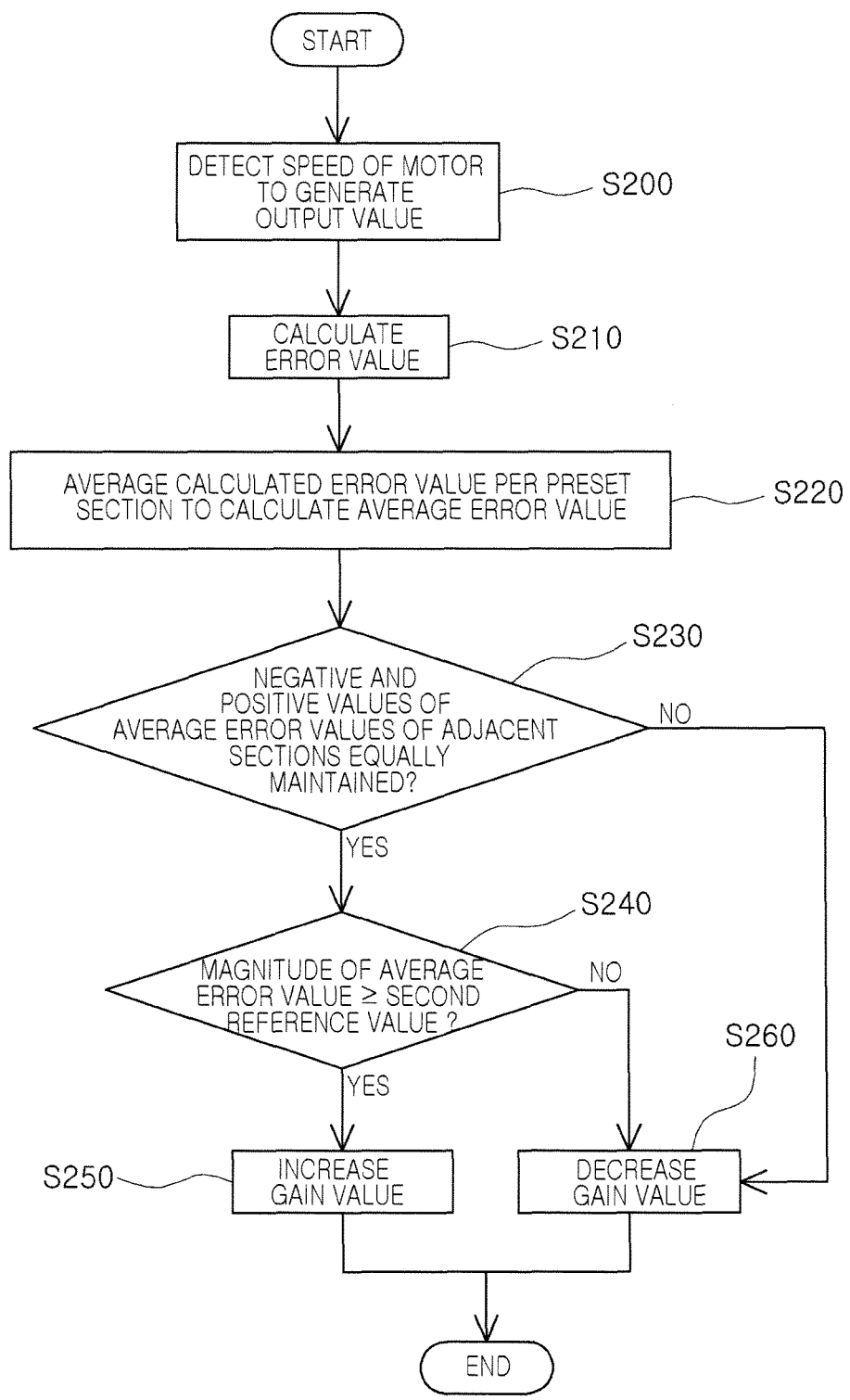

FIG. 4 is a flowchart for describing a method of controlling a motor according to an embodiment of the present invention. A method of adjusting the gain of the method of controlling the motor according to the embodiment of the present invention will be described with reference to FIG. 4.

The detecting unit 300, one component of the apparatus for controlling the motor according to the embodiment of the present invention, may detect the motor speed to thereby generate the output value (S200).

The output value generated from the detecting unit 300 is sent to the comparing unit 100, and the comparing unit 100 may compare the received output value with the target value to thereby generate the error value (S210).

The operating unit 210 may average the error value generated from the comparing unit 100 for each section having the predetermined interval, thereby calculating the average error value (S220).

The average error value calculated from the operating unit 210 is sent to the gain adjusting unit 230, and the gain adjusting unit 230 may adjust the gain value of one of the proportional control and the proportional integral control selected from the control selecting unit 220.

The gain adjusting unit 230 may compare the negative and positive values of the average error values of the sections adjacent to each other to thereby detect whether or not the negative and positive values of the average error values are changed (S230). The case in which the negative and positive values of the average error values of the sections adjacent to each other are changed may refer to a case that overshooting is generated. In the case in which overshooting is generated, the gain adjusting unit 230 may decrease the gain (S260).

However, in the case in which the negative and positive values of the average error values of the sections adjacent to each other are equally maintained, it is determined that overshooting is not generated to thereby compare the magnitude of the average error value with the preset second reference value (S240).

In the case in which the magnitude of the average error value is higher than the preset second reference value, the response speed may be increased by increasing the gain value (S250), and in the case in which the magnitude of the average error value is lower than the preset second reference value, stability may be increased by decreasing the gain value (S260).

Figure 5A:
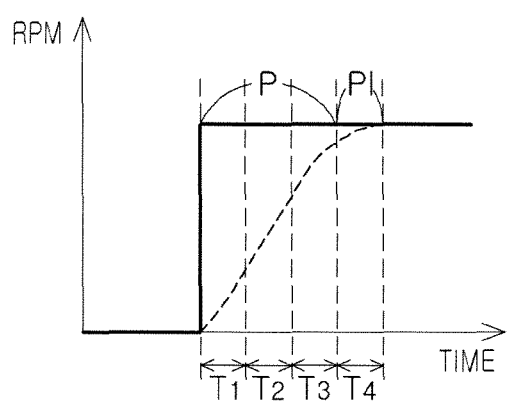
FIGS. 5A and 5B are views provided in order to describe the method of controlling the motor according to an embodiment of the present invention.
Figure 5B:
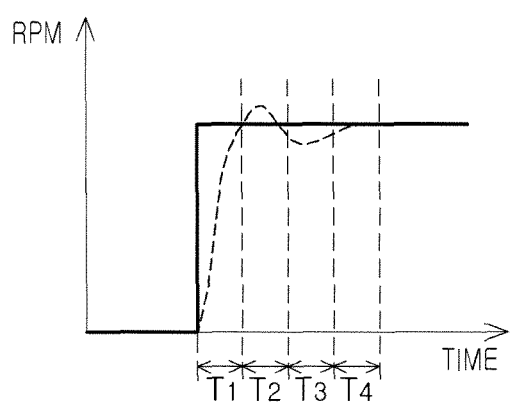

FIGS. 5A and 5B are views provided in order to describe the method of controlling the motor according to an embodiment of the present invention.

In FIGS. 5A and 5B, a horizontal axis represents a time axis and a vertical axis represents revolutions per minute, an index representing the motor speed. In addition, a solid line is a graph representing the target value for controlling the motor and a dotted line is a graph representing the output value generated by detecting the motor speed. In addition, the sections of T1 to T4 have the same interval.

It may be seen that the target value is changed at a start time point of the T1 section. In the case in which the target value is changed, the apparatus for controlling the motor performs the proportional control (P). Next, the comparing unit 100 may calculate the error value by comparing the output value generated in the detecting unit 300 with the target value, and the operating unit 210 may calculate the average error value according to the calculated error value. The average error value in each section may be calculated by dividing a difference between an area of the output value and an area of the target value by each time interval.

Referring to FIG. 5A, with the passage of time from the T1 section to T4 section, it may be seen that the difference between the area of the output value and the area of the target value decreases. That is, it may be seen that the average error value is gradually decreased. Therefore, since the average error value is gradually decreased, the proportional control (P), performed at the start time point of the T1 section in which the target value varies, may be changed to the proportional integral control (PI) according to the preset first reference value. FIG. 5A shows that the proportional integral control PI is performed from the T4 section on the assumption of the case in which the average error value of the T3 section is lower than the preset first reference value.

Referring to FIG. 5B, since the error value, the difference between the target value and the output value, is positive in the T1 section, it may be seen that the average error value is also positive. Meanwhile, it may be seen that the average error value is negative in the T2 section and is positive in the T3 section. Therefore, in this case, it is determined that overshooting is detected, such that the gain value of the proportional control and the proportional integral control selected by comparing between the preset first reference value and the magnitude of the average error value may be decreased. However, since the T3 section and the T4 section have no change in the negative or positive value of the average error value, whether the gain value is increased or decreased may be determined by comparing the magnitude of the average error value with the preset second reference value.

As set forth above, according to the embodiment of the present invention, the proportional control or a proportional integral control is selectively performed according to the transient state, whereby the system may be stably implemented and the control variable may be changed in real time even in the case in which the target value is changed, such that the accurate and easy control may be performed.

While the present invention has been shown and described in connection with the embodiments, it will be apparent to those skilled in the art that modifications and variations can be made without departing from the spirit and scope of the invention as defined by the appended claims.

What is claimed is:

1. An apparatus for controlling a motor, comprising:
   a comparing unit comparing a target value and an output value and calculating error values therefrom; and
   a controlling unit controlling the motor by selecting one of a proportional control and a proportional integral control according to an average error value calculated by averaging the error values for each section having a predetermined interval and adjusting a gain value of the selected control.

2. The apparatus of claim 1, wherein the controlling unit includes:
   an operating unit averaging the error value for each of the section and calculating the average error value;
   a control selecting unit selecting one of a proportional control and a proportional integral control according to the average error value;
   a gain adjusting unit adjusting the gain value of the control selected by the control selecting unit according to the average error value; and
   a proportional/proportional integral control unit controlling the motor according to the control selected from the control selecting unit and the gain value.

3. The apparatus of claim 2, wherein the control selecting unit selects one of the proportional control and the proportional integral control by comparing a magnitude of the average error value with a preset first reference value.

4. The apparatus of claim 3, wherein the control selecting unit selects the proportional control in the case in which the magnitude of the average error value is equal to the first reference value or more than the first reference value and selects the proportional integral control in the case in which the magnitude of the average error value is lower than the first reference value.

5. The apparatus of claim 2, wherein the gain adjusting unit adjusts the gain value by comparing negative and positive values of the average error values of sections adjacent to each other among the sections.

6. The apparatus of claim 5, wherein the gain adjusting unit decreases the gain value in the case in which the negative and positive values of the average error values of the sections adjacent to each other among the sections are changed.

7. The apparatus of claim 5, wherein the gain adjusting unit compares the magnitude of the average error value with a preset second reference value in the case in which the negative and positive values of the average error values of the sections adjacent to each other among the sections are maintained.

8. The apparatus of claim 7, wherein the gain adjusting unit increases the gain value in the case in which the magnitude of the average error value is equal to the second reference value or more than the second reference value and decreases the gain value in the case in which the magnitude of the average error value is lower than the second reference value.

9. The apparatus of claim 8, wherein the second reference value includes a plurality of preset third reference values,
the plurality of third reference values are arranged at a preset interval to thereby form gain adjusting sections having different gain adjustment magnitudes, and
the gain adjusting unit adjusts the gain value according to the gain adjustment magnitude of the gain adjusting section in which the magnitude of the average error value exists.

10. The apparatus of claim 2, wherein the proportional/proportional integral control unit includes:
a proportional controller performing the proportional control; and
a proportional integral controller performing the proportional integral control.

11. The apparatus of claim 1, further comprising a detecting unit detecting a motor speed to generate the output value.

12. A method of controlling a motor, comprising:
comparing an output value generated by detecting a motor speed with a target value to generate an error value;
averaging the error value for each section having a predetermined interval to generate an average error value;
selecting one of a proportional control and a proportional integral control according to the average error value; and
adjusting a gain value of one of the proportional control and the proportional integral control selected according to the average error value.

13. The method of claim 12, wherein in the selecting of one control, the proportional control is selected in a case in which magnitude of the average error value is a preset first reference value or more, and the proportional integral control is selected in a case in which the magnitude of the average error value is lower than the first reference value.

14. The method of claim 12, wherein in the adjusting of the gain value, the gain value is adjusted by comparing negative and positive values of the average error values of sections adjacent to each other among the sections.

15. The method of claim 14, wherein in the adjusting of the gain value, the gain value is decreased in a case in which the negative and positive values of the average error values are changed.

16. The method of claim 14, wherein in the adjusting of the gain value, the magnitude of the average error value is compared with a preset second reference value in a case in which the negative and positive values are maintained.

17. The method of claim 16, wherein in the adjusting of the gain value, the gain value is increased in a case in which the magnitude of the average error value is higher than the second reference value, and the gain value is decreased in a case in which the magnitude of the average error value is lower than the second reference value.

* * * * *